(No Model.)
J. LEWIS.
COMBINED AIR AND GAS BURNER.
No. 255,875. Patented Apr. 4, 1882.
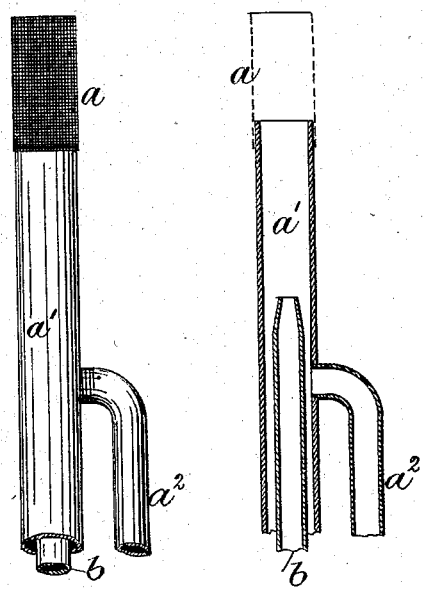
Witnesses
J. G. Longue
T. R. Wyatt
Inventor.
James Lewis

UNITED STATES PATENT OFFICE.

JAMES LEWIS, OF SAFE HARBOUR, ARBOR SQUARE, COUNTY OF MIDDLESEX, ENGLAND.

COMBINED AIR AND GAS BURNER.

SPECIFICATION forming part of Letters Patent No. 255,875, dated April 4, 1882.

Application filed December 28, 1881. (No model.) Patented in England April 14, 1881, in France October 14, 1881, in Germany October 14, 1881, and in Austria November 16, 1881.

*To all whom it may concern:*

Be it known that I, JAMES LEWIS, a subject of the Queen of Great Britain, residing at Safe Harbour, Arbor Square, in the county of Middlesex, England, have invented certain new and useful Improvements in Combined Air and Gas Burners to Increase the Illuminating and Heating Power of Gas, (for which I have received Letters Patent in Great Britain, No.1,665, dated 14th April, 1881; in France, dated 14th October, 1881; in Germany, dated 14th October, 1881, and in Austria, dated 16th November, 1881,) of which the following is a specification.

This invention relates to improvements in combined air and gas burners, whereby the illuminating and heating power of the gas burned is greatly increased. For this purpose, according to one method of carrying out my invention, I find it advantageous to use what is known as an "Argand burner," or any burner which produces a circular or other shaped hollow flame, in order that a current of atmospheric air (or it may be any suitable gas) may be injected by a pipe (suitably arranged in combination with the burner) into the center of such hollow flame in a similar manner to that which is generally known as the "Bunsen burner," or in like manner to a blow-pipe.

Upon the end of the pipe I mount a cage made of platinum wire-gauze, into which the gas jet of same projects when the gas is lighted. At first very little light is afforded; but when the wire-gauze becomes highly heated (as it will be in a short time after the gas is lighted) the combined air and gas will be so acted upon by the intense heat of the wire-gauze as to effect its more perfect combustion, a brilliant light and intense heat being the result.

In place of making the combustion-chamber of platinum wire-gauze, any other suitable metallic wire or finely-perforated surfaces or plates which will resist an intense heat may be employed, or the cage or combustion-chamber may be made of any suitable metallic or mineral substance—such as plumbago, asbestus, or of fire-resisting clay earth or compound.

Ordinary carbureted-hydrogen gas and common atmospheric air may be used for illuminating purposes, as above described. At the same time I do not limit myself thereto, as other descriptions of gases or gases and air may be used in combination for particular purposes for obtaining light and generating heat.

The air (heated, if desired) may be injected into the gas-flame and the perforated combustion-chamber (above or around the end of the gas burner) at varying pressures, according to the size and character of the burner used; but I find that a pressure of about two pounds on the square inch serves for forcing the air into the flames of ordinary gas-burners of the sizes in general use for illuminating purposes. The relative proportions of the combined air and gas consumed is about one of gas to two of air; but this may be varied according to the size and character of the burner, the supply of each being regulated as required by a tap or valve, as is well understood.

The flames from petroleum and other lamps in which gas is generated may be surrounded by a cage or inclosure of platina or other wire-gauze, a current of air being forced into the flame from a suitable reservoir, bellows, or other mechanical contrivance to increase the illuminating and heating power of such gas-lamps in accordance with my improvements.

In order that my invention may be clearly understood and readily carried into practice, I will now proceed to describe the drawings hereto annexed, which show in Figure 1 a side elevation, and in Fig. 2 a vertical central section, of a combined air and gas burner arranged and constructed so as to consume air and gas combined under pressure in accordance with my invention.

$a$ is a cage or cap, (mounted on the end of the pipe $a'$,) made of fine platina wire-gauze, and forming a combustion-chamber for the mixture of air and gas conducted into it by the pipes $a'$ and $b$. The air or the gas, or both, may be forced at a suitable pressure into either of the pipes $a'$ or $b$, and if forced into the central pipe, $b$, an induced current of air may be drawn in through the branch pipe $a^2$ or otherwise. The air and gas become intimately mixed or combined before they reach the cage or combustion-chamber $a$, which becomes highly heated, and when in an incandescent state transmits a brilliant light, at the same time developing great heat, which may be allowed to radiate or be conducted away for heating and ventilating purposes.

I have only considered it necessary to show a simple form of burner for consuming air and gas combined in accordance with my invention; but it will be evident that the same may be greatly varied without departing from the true character of my invention, and I would here remark that when it is desired to apply my improved air and gas burner to heating purposes alone the combustion-chamber may be composed or constructed either of platina wire or of other metals, earth, or other materials, as previously stated, which will resist the temperature to which they may be subjected for heating purposes without being melted or destroyed thereby.

The pressure of the air or gas in the application of my improvements to heating, ventilating, and other purposes, except lighting, must be regulated to suit the particular purpose to which the application is made, the metal or the materials of which the burner or combustion-chamber is composed being also such as will suit the particular purpose to which it is applied; but in cases where an intense heat is required to be applied to any particular purpose, then platina wire-gauze, or its alloys, or allied metals or fire-resisting earths or minerals must be employed for the burner or combustion-chamber. The form of burner or combustion-chamber which I employ (of whatever material it is made) would in all cases correspond in character or construction with that described and shown in the drawings annexed—viz., a chamber formed or surrounded with porous or very finely perforated surfaces, the air and gas previously combined being forced under pressure into the burner or combustion-chamber, wherein the combined air and gas is caused to impart an intense heat to the porous or perforated surfaces of the burner or combustion-chamber, whereby very perfect combustion of the combined air and gas is effected.

In consequence of the complete combustion of all noxious and deleterious products by my combined air and gas burner, its application to various useful purposes is thus rendered available, whereas the ordinary well-known air and gas burner is not applicable to such purposes, owing to the noxious vapors and gases resulting therefrom. For instance, my improved method of burning air and gas combined under pressure, combined with my incandescent burner, is very suitable for applying heat to conservatories, hot-houses, cooking apparatus, and other like purposes where the noxious gases evolved by the ordinary methods of consuming gas precludes its use for such purposes.

I do not herein claim the separate and individual parts which enter into the construction of my improved burner, and am aware that wire caps have been used before, and also that tubes within tubes have been employed, and that in certain constructions an outer tube has had lateral inlet-orifices; but none, so far as I am aware, have the construction and operation of my invention.

Having thus described the nature of my invention and the manner of performing or carrying the same into practice, I would remark that I am aware that platinum has before been used in combination with certain gases for producing heat and light by special arrangements of apparatus. I therefore make no claim to its use and application for these purposes, except in the manner previously described, nor do I claim any part of the apparatus (previously described) separately which is well known and in common use; but

What I claim is—

The improved burner described, consisting of tube $a'$, surmounted by the described cap $a$, and arranged and adapted for having a current forced into it under pressure, the tube $b$ within the same, also adapted for a forced current under pressure, and the lateral tube or pipe $a^2$, entering tube $a'$ at a point below the tip or exit end of tube $b$, and adapted for an induced current, these parts being combined and arranged for operation as shown and described.

JAMES LEWIS.

Witnesses:
JOHN DEAN,
H. E. DALE,
   Both of 17 Gracechurch Street, London.